Jan. 3, 1950 P. C. CROWDER 2,493,528
SPRINKLER
Filed Nov. 5, 1945 4 Sheets-Sheet 3
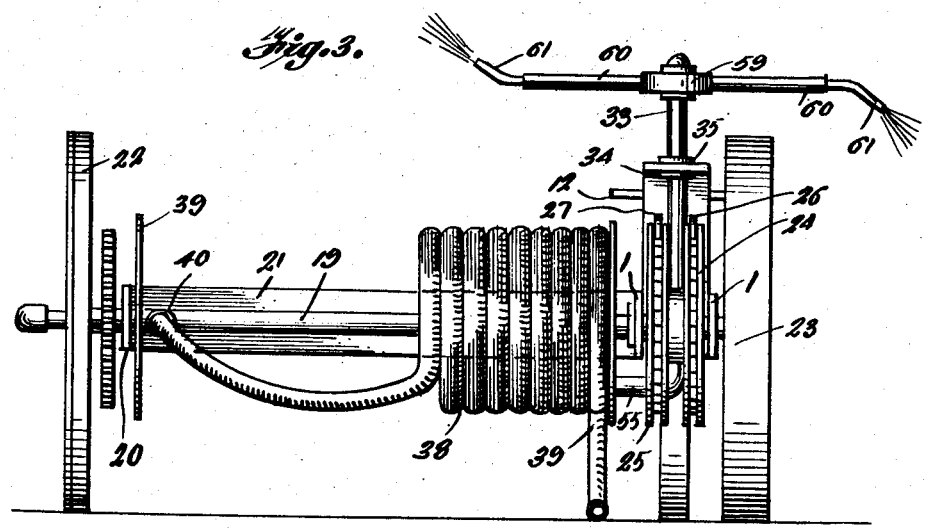
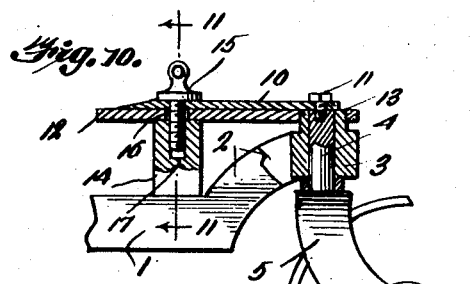
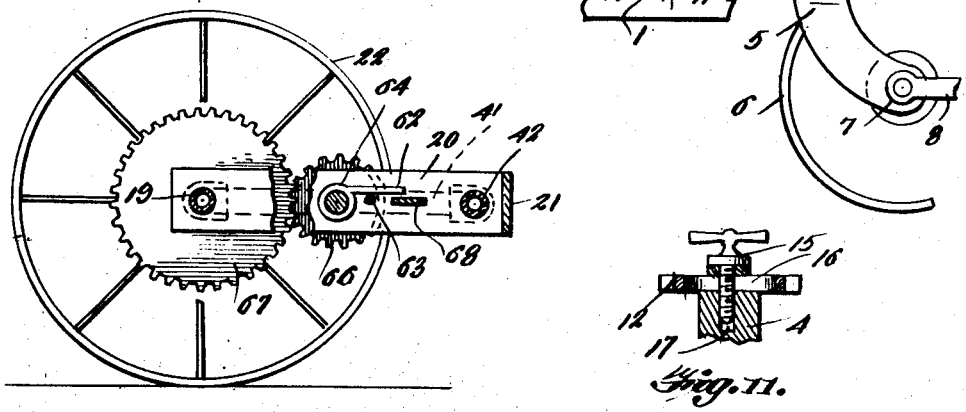
INVENTOR.
PAUL C. CROWDER
BY Jan. 3, 1950  P. C. CROWDER  2,493,528
SPRINKLER
Filed Nov. 5, 1945  4 Sheets-Sheet 4
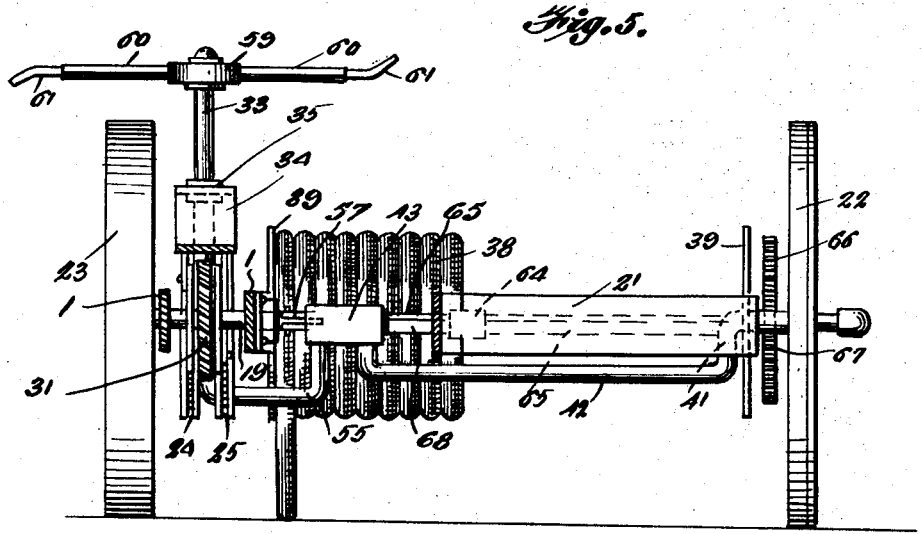
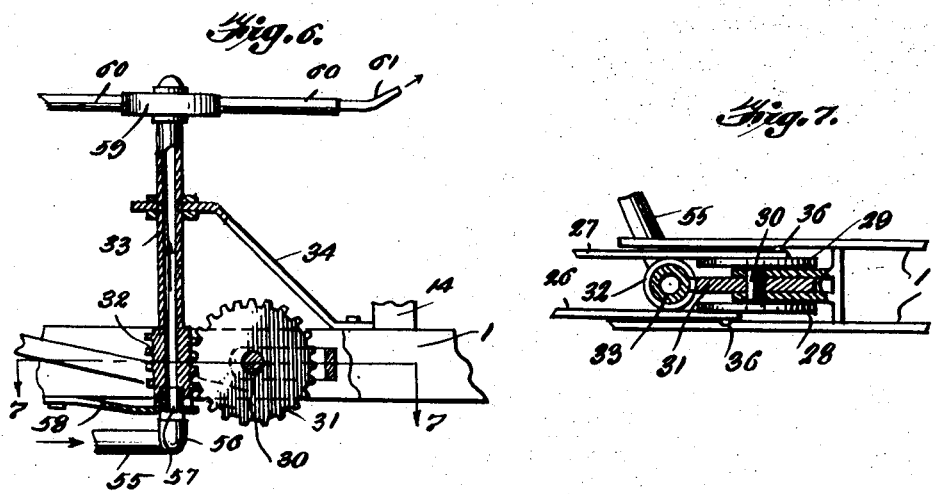
INVENTOR.
PAUL C. CROWDER
BY Patented Jan. 3, 1950

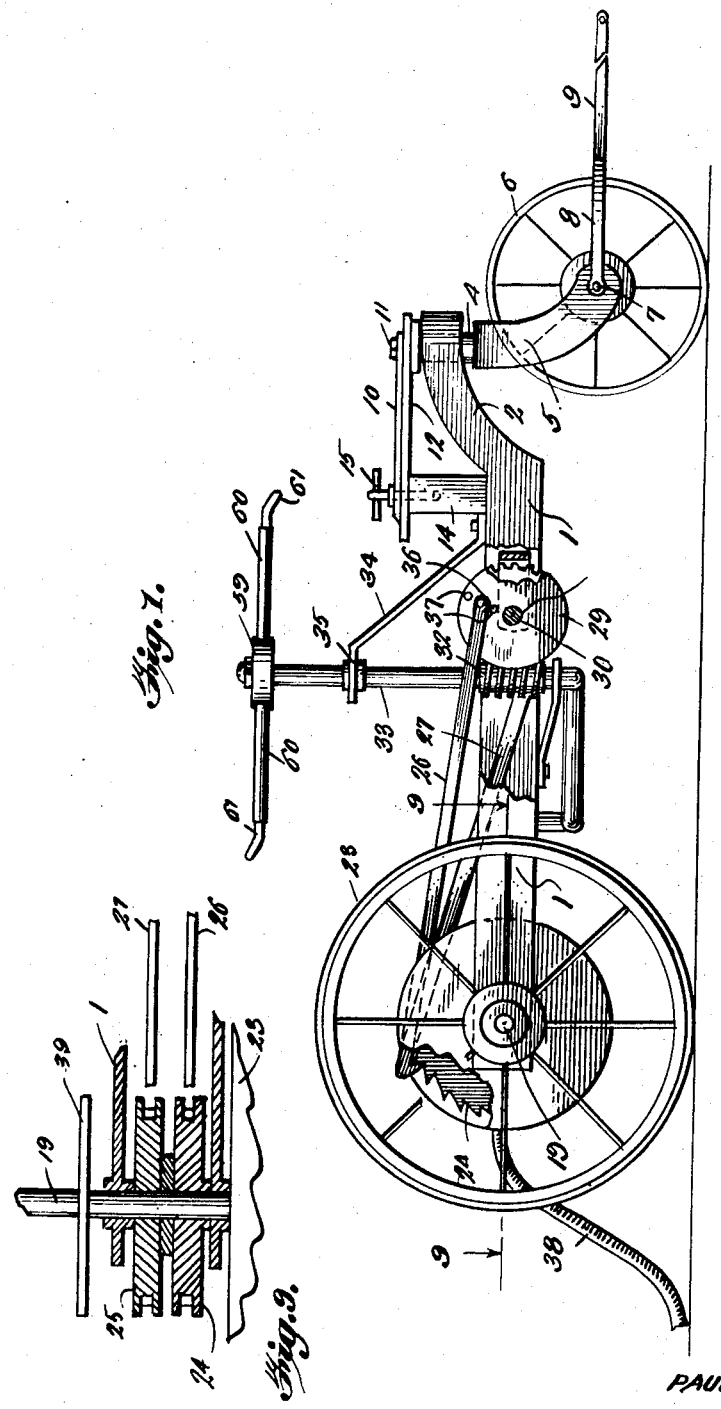

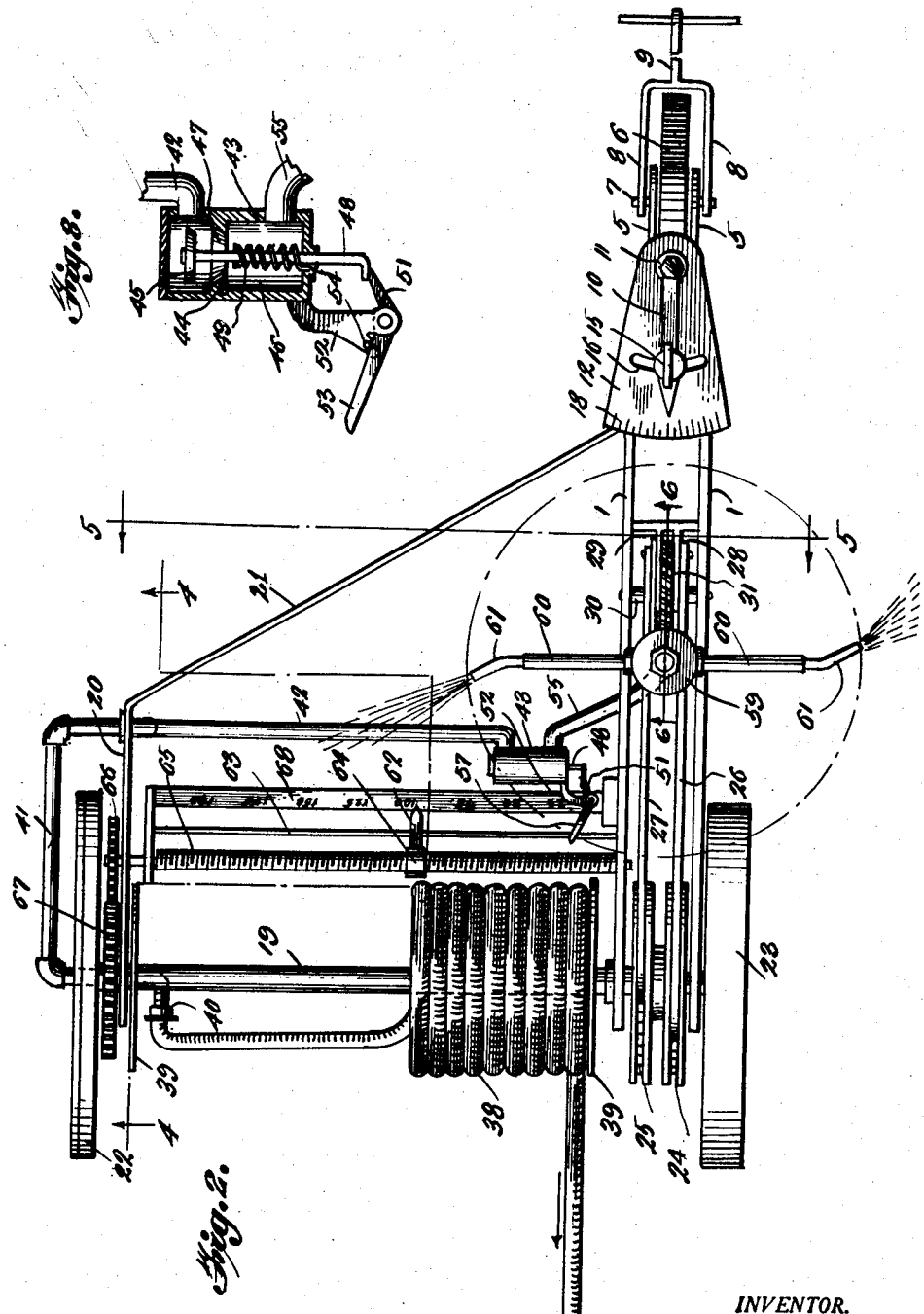

2,493,528

UNITED STATES PATENT OFFICE 2,493,528

SPRINKLER

Paul C. Crowder, Sahara Village, Utah

Application November 5, 1945, Serial No. 626,703

2 Claims. (Cl. 299—50)

This invention relates to a lawn sprinkler and it is one object of the invention to provide a sprinkler which is of such construction that it may be caused to travel across a lawn or between rows of growing plants in a garden and the lawn or garden sprinkled without use of a motor for imparting movement to the carriage. It will thus be seen that there will be no motor to become damaged by water and also that gasoline or other fuel is not necessary to operate the sprinkler.

Another object of the invention is to provide a sprinkler wherein water is discharged from arms radiating from the upper end of the tubular post or shaft rotatably mounted in vertical position, the shaft serving to rotate a gear carrying ratchet bars which engage ratchet wheels mounted at a side of a drive wheel for the carriage of the sprinkler. It will thus be seen that the tubular shaft carrying the arms of the sprinkler not only serves as a sprinkler shaft but also as a shaft from which rotary movement is imparted to the drive wheel of the carriage and the sprinkler will be driven by water power.

Another object of the invention is to so mount the ratchet bars that they may be adjusted radially of a disc to which they are pivoted and thus control the speed at which the apparatus moves forwardly.

Another object of the invention is to provide means for shutting off flow of water after the sprinkler has moved forwardly a predetermined distance and thus allow the sprinkler to be automatically brought to a stop when it has travelled forwardly across a lawn or field.

Another object of the invention is to provide a sprinkler including a reel upon which hose is wound and gradually unwound as the sprinkler moves forwardly.

Another object of the invention is to provide a sprinkler which may have a front wheel or castor secured in a set position and cause the sprinkler to travel forwardly in a straight path or in a circular path.

Another object of the invention is to provide a wheeled and self-propelled sprinkler which is of simple construction and very efficient in operation.

The invention is illustrated in the accompanying drawings wherein

Fig. 1 is a side elevation of the improved sprinkler.

Fig. 2 is a top plan view of the sprinkler.

Fig. 3 is a rear view of the sprinkler.

Fig. 4 is a sectional view taken along the line 4—4 of Figure 2.

Fig. 5 is a view taken along the line 5—5 of Figure 2.

Fig. 6 is a fragmentary sectional view taken along the line 6—6 of Figure 2.

Fig. 7 is a sectional view taken along the line 7—7 of Figure 6 with parts in elevation.

Fig. 8 is a sectional view taken longitudinally through the valve for controlling flow of water.

Fig. 9 is a fragmentary sectional view taken along the line 9—9 of Figure 1.

Fig. 10 is a fragmentary sectional view showing the manner in which the front wheel or castor is mounted.

Fig. 11 is a fragmentary sectional view taken along the line 11—11 of Figure 10.

This improved sprinkler has a carriage including the construction longitudinally extending bars 1 having upwardly curved front end portions 2 between which is mounted a bearing 3 to receive the post 4 of forks 5 carrying a wheel 6. This front wheel is formed as a castor so that it may be set to guide forward movement of the sprinkler in a straight line or along a circular path. The axle 7 of the front wheel protrudes from the forks 5 and about the projecting ends of the axle are engaged the forks 8 of a tongue 9 which is provided so that the sprinkler may be drawn forwardly either manually or by a truck or other vehicle to a lawn or field to be sprinkled.

The front wheel or castor must be held in a set position in order to cause the sprinkler to move in a straight line or follow a circular path and in order to do so there has been provided an arm or pointer 10 which is firmly secured to the upper end of the post 4 by a screw 11 and projects rearwardly over the post over a plate 12. The plate 12 extends horizontally with its front end mounted about the neck 13 of the bearing 3 and its rear end portion supported upon a block 14. A screw 15 having a winged head at its upper end passes through the rear portion of the pointer and through an arcuate slot 16 formed transversely of the plate 12 and is screwed into a socket 17 formed in the block 14 and when the screw is tightened the parts will be held in a set position to cause the sprinkler to move forwardly in a straight line or follow a circular path. By observing the relation of the pointer to the scale 18 the direction in which the sprinkler will move forwardly may be determined.

A tubular shaft or axle 19 extends transversely across the rear end portion of the frame and is rotatably mounted through rear end portions of the bars 1 and also rotatably mounted through the rear end portion of a bar 20 which has a portion 21 extending diagonally at a forward incline and secured against one of the bars 1 rearwardly of the upwardly curved portion 2 thereof. Wheels 22 and 23 are carried by the axle or shaft, the wheel 23 being fixed to the shaft and serving as a drive wheel for the sprinkler and the wheel 22 being loose on the shaft so that turns may be readily made when towing the sprinkler or driving it in a circular path. Ratchet wheels 24 and 25 are fixedly secured to the shaft 19 and engaged by the hooked rear ends of ratchet bars 26 and 27 which extend longitudinally of the frame between the bars 1 and have their front ends pivotally connected with disks 28 and 29 so that when the disks are turned with the shaft 30 carrying them the ratchet bars or elongated parts 26 and 27 will be reciprocated and the bills or hooks at their rear ends will alternately have operative engagement with teeth of the ratchet wheels 24 and 25 and one impart forward turning movement to the shaft 19 while the other is moving forwardly into position for pulling engagement with its companion ratchet wheel when it moves forwardly. A worm gear 31 is fixedly carried by the shaft 30 and meshes with a worm 32 carried by a vertically extending rotatably mounted tubular shaft or pipe section 33 which is held in the upright position by a bracing bar 34 having a bearing 35 at its upper or rear end through which the shaft 33 passes. As the tubular shaft or pipe section 33 turns rotary movement will be transmitted to the shaft 30 and the bars 26 and 27 reciprocated to alternately turn the ratchet wheels 24 and 25 and rotate the shaft 19. Each of the ratchet bars has its front end connected with the companion disk by a screw or pin 36 screwed into one of the openings 37 formed in a row extending radially of the disk and by changing the pins to a selected set of openings 37 longitudinal movement of the ratchet bars may be controlled and the speed at which the carriage moves forwardly regulated.

In order to supply water to the sprinkler there has been provided a hose 38 which is wound about the shaft 19 between disks 39 and has its inner end connected with a coupling 40. The outer end of the hose is equipped with a coupling for connection with a spigot of a water supply pipe and as the sprinkler moves forwardly the hose will be unwound from the reel formed by the shaft 19 and the disks 39. While the hose has been shown wound about the shaft 19 for only a portion of the distance between the disks 39 it will be understood that it may occupy the entire length of the shaft between the disks and also may have as many layers as necessary according to the length of the hose. A suitable coupling connects the shaft 19 with a pipe line 41 having a portion 42 extending transversely of the carriage and connected with a valve 43. This valve has its casing divided by a partition 44 to provide chambers 45 and 46 which communicate with each other through an opening 47 surrounded by a tapered valve seat. A valve stem 48 is slidable longitudinally in the valve casing and at its inner end carries a valve head 45 which is moved to a closed position blocking the opening 47 when the valve stem is urged outwardly to close the valve by a spring 49 coiled about the valve stem and having one end anchored to the head of the valve casing and its other end connected with the valve stem as shown in Figure 3.

A latch 51 is pivoted to a bracket 52 carried by the valve casing and has a handle or lever arm 53 held in engagement with an abutment pin 54 on the bracket when the outer end of the valve stem is in abutting engagement with the latch 51 to hold the valve open.

A pipe 55 extends from the outer end of the valve casing and the outer or front end of this pipe 55 is connected with a coupling 56 carrying an upstanding nipple 57 which is held in the lower end of the tubular shaft 33 by a bracket 58 and constitutes a bearing for the lower end of the tubular shaft. Water which flows upwardly through the shaft 33 enters a head 59 at the upper end thereof and flows outwardly through tubular arms 60 carrying nozzles 61 which are bent laterally so that as water is discharged from the nozzles push will be exerted and the arms swung in a circular path and rotate the shaft 33. It will thus be seen that the water will be discharged in a circular spray covering a large area of ground and the shaft 33 rotated so that forward movement will be imparted to the carriage. By shifting the nozzles 61 longitudinally of the arms 60 the combined length of the arms and their nozzles may be adjusted and the speed at which the shaft 33 is turned controlled. The water serves to sprinkle a lawn or garden and also serves to drive the shaft 33 and no other motor need be provided for driving the sprinkler forwardly.

After the sprinkler has traveled from one side of a lawn or garden to the other in a straight path it should be brought to a stop. In order that this may be automatically done there has been provided an arm 62 slidably along a rod 63 extending transversely of the carriage and having at its rear end a jaw 64 in theaded engagement with a threaded shaft 65. The shaft 65 is rotatably mounted through the bar 20 and the inner bar 1 and at one end carries a gear 66 meshing with a gear 67 carried by the tubular shaft 19 and as the shaft 19 turns rotary motion will be transmitted to the shaft 65 and the arm or pointer 62 moved transversely of the carriage with its free front end moving along a bar 68 having its upper face marked with a scale indicating distances in feet, or other linear measurements. When the sprinkler is to be operated the arm is shifted to dispose its front end at the scale marking of bar 68 representing the width of a lawn or garden to be watered and in Figure 2 this distance will be one hundred feet. As the sprinkler moves forwardly the arm will be moved by the threaded shaft 65 until it reaches the lever or handle 57 of the latch 51 and apply pressure to this lever to swing the latch 51 about its pivot and eventually move the latch out of engagement with the rearwardly bent end of the valve stem 48. The spring 50 will then shift the stem longitudinally and the valve head 45 will close the opening 47 and shut off flow of water through the valve casing and the pipe 55. The shaft 33 will then cease to turn and the sprinkler will come to a stop. The sprinkler may then be returned to the side of the lawn or garden from which it started and the hose rewound about the reel and the sprinkler may be again started across the lawn or garden for another sprinkling operation.

Having thus described the invention, what is claimed is:

1. In a sprinkler including a carriage having rear wheels carried by a tubular shaft rotatably mounted transversely of the carriage, and a pipe line leading from the tubular shaft, a valve interposed in the pipe line and normally closed, a latch for releasably holding the valve open, a threaded shaft rotatably mounted transversely of the carriage and rotated from the tubular shaft during forward movement of the carriage, and a member adapted to be shifted to an adjusted position along the threaded shaft and disposed in threaded engagement therewith and then moved longitudinally of the shaft by rotation of the threaded shaft into position for engaging the latch to move the latch to a releasing position permitting closing of the valve to shut off flow of water through said pipe line.

2. In a sprinkler including a carriage having wheels carried by a tubular shaft extending transversely of the carriage and rotatably mounted, a pipe line for delivering water from the tubular shaft, a valve in the pipe line normally closed, a latch for releasably holding the valve open, a threaded shaft rotatably mounted transversely of the carriage in front of the tubular shaft, gears carried by the tubular shaft and the threaded shaft and meshing for transmitting rotation from the tubular shaft to the threaded shaft, a rod extending transversely of the carriage in front of the threaded shaft, an arm slidable along said rod and having a threaded member at its rear end for engaging the threaded shaft and shifting the arm transversely of the carriage into position for engaging the latch and moving the latch to a releasing position permitting closing of the valve when the threaded shaft is rotating, and a bar extending transversely of the carriage and overlapped by the arm, said bar having distance markings thereon whereby the arm may be shifted along the rod to a predetermined distance marking upon the bar and then engaged with the threaded shaft for movement transversely of the carriage into position for engaging the latch and moving the latch to the said position to release the valve for permitting closing thereof to shut off flow of water.

PAUL C. CROWDER.

REFERENCES CITED

The following references are of record in the file of this patent:

UNITED STATES PATENTS

| Number | Name | Date |
|---|---|---|
| 724,350 | Stauft | Mar. 31, 1903 |
| 1,658,202 | Jones | Feb. 7, 1928 |
| 1,744,520 | Blitz | Jan. 21, 1930 |
| 1,919,703 | Nielson | July 25, 1933 |
| 2,152,425 | Nilson | Mar. 28, 1939 |
| 2,228,428 | Wilson | Jan. 14, 1941 |